(12) United States Patent
Duenner et al.

(10) Patent No.: US 10,147,103 B2
(45) Date of Patent: Dec. 4, 2018

(54) SYSTEM AND METHOD FOR A SCALABLE RECOMMENDER SYSTEM USING MASSIVELY PARALLEL PROCESSORS

(71) Applicant: International Business Machines Corporation, Armonk, NY (US)

(72) Inventors: Celestine Duenner, Wettswil (CH); Thomas Parnell, Zurich (CH); Charalampos Pozidis, Thalwil (CH); Vasileios Vasileiadis, Waedenswil (CH); Michail Vlachos, Rueschlikon (CH)

(73) Assignee: International Business Machines Corproation, Armonk, NY (US)

( * ) Notice: Subject to any disclaimer, the term of this patent is extended or adjusted under 35 U.S.C. 154(b) by 69 days.

(21) Appl. No.: 15/468,308

(22) Filed: Mar. 24, 2017

(65) Prior Publication Data

US 2018/0276688 A1 Sep. 27, 2018

(51) Int. Cl.
| | |
|---|---|
| *G06F 12/00* | (2006.01) |
| *G06Q 30/02* | (2012.01) |
| *H04L 29/08* | (2006.01) |
| *G06F 13/16* | (2006.01) |
| *G06N 3/04* | (2006.01) |
| *G06F 9/30* | (2018.01) |
| *G06F 9/52* | (2006.01) |
| *H04L 12/801* | (2013.01) |
| *G06Q 50/00* | (2012.01) |

(52) U.S. Cl.
CPC ....... *G06Q 30/0201* (2013.01); *G06F 9/3009* (2013.01); *G06F 9/30036* (2013.01); *G06F 9/528* (2013.01); *G06F 13/1663* (2013.01); *G06N 3/0472* (2013.01); *H04L 67/22* (2013.01); *G06Q 50/01* (2013.01); *H04L 47/127* (2013.01)

(58) Field of Classification Search
CPC ..... G06F 9/30036; G06F 9/3009; G06F 9/528
See application file for complete search history.

(56) References Cited

U.S. PATENT DOCUMENTS

| | | |
|---|---|---|
| 8,994,739 B2 | 3/2015 | Killough |
| 9,117,284 B2 | 8/2015 | Nienhaus et al. |
| 2014/0149590 A1 | 5/2014 | Mallipeddi et al. |

FOREIGN PATENT DOCUMENTS

| | | |
|---|---|---|
| CN | 105335215 A | 2/2016 |
| WO | 2015100956 A1 | 6/2016 |

*Primary Examiner* — Gurtej Bansal
(74) *Attorney, Agent, or Firm* — Daniel P. Morris, Esq.; Hoffmann & Baron, LLP

(57) ABSTRACT

Methods and apparatus are provided to determine entities and attributes dependencies for creating recommendations of items or entities using a highly scalable architecture. For example, a user may be recommended an item if a probability model of the method determines that the user relates to the item although the user has no contact to the item before the method is performed. The methods and apparatus provide a data structure representing a matrix having rows representing entities and columns representing attributes of the entities. Each entity of the entities of the data structure may include a user and each attribute of the attributes of the data structure may include an item. A cell of the matrix may be formed by a component pair including an entity and an attribute. In this manner, the methods and apparatus provide an efficient way for processing the probability model.

19 Claims, 6 Drawing Sheets

|       | 0 | 1   | 2   | 3   | 4   | 5   | 6   | 7   | 8   | 9   | 10 | 11 |
|-------|---|-----|-----|-----|-----|-----|-----|-----|-----|-----|----|----|
| 0     | 0 | 0   | 0   | .9  | .89 | .9  | .7  | 0   | 0   | 0   | 0  | 0  |
| 1     | 0 | 0   | 0   | .77 | .77 | .77 | .54 | 0   | 0   | 0   | 0  | 0  |
| 2     | 0 | 0   | 0   | .9  | .89 | .9  | .7  | 0   | 0   | 0   | 0  | 0  |
| 3     | 0 | 0   | 0   | 0   | 0   | 0   | 0   | 0   | 0   | 0   | 0  | 0  |
| 4     | 0 | .9  | .9  | .9  | .7  | 0   | 0   | 0   | 0   | 0   | 0  | 0  |
| 5     | 0 | .9  | .9  | .9  | .7  | 0   | 0   | 0   | 0   | 0   | 0  | 0  |
| 6     | 0 | .77 | .77 | .77 | .83 | .83 | .83 | .83 | .83 | .83 | 0  | 0  |
| 7     | 0 | 0   | 0   | 0   | .76 | .92 | .92 | .92 | .92 | .92 | 0  | 0  |
| 8     | 0 | 0   | 0   | 0   | .76 | .92 | .92 | .92 | .92 | .92 | 0  | 0  |
| 9     | 0 | 0   | 0   | 0   | .76 | .92 | .92 | .92 | .92 | .92 | 0  | 0  |
| 10    | 0 | 0   | 0   | 0   | 0   | 0   | 0   | 0   | 0   | 0   | 0  | 0  |
| 11    | 0 | 0   | 0   | 0   | 0   | 0   | 0   | 0   | 0   | 0   | 0  | 0  |

Item 4 is relevant to User 6 with confidence 0.83 because:

A. User 6 has access to Items 1-3. Users with similar access history (e.g., Users 4-5) also accessed Item 4.

B. Moreover, User 6 has access to Items 5-9. Users with similar access history (e.g., Users 7-9) also accessed Item 4.

Fig. 5

SYSTEM AND METHOD FOR A SCALABLE RECOMMENDER SYSTEM USING MASSIVELY PARALLEL PROCESSORS

BACKGROUND

The present invention relates to the field of digital computer systems, and more specifically, to a method for determining entities and attributes dependencies.

Graphs are a popular data representation for modeling dependencies, relationships, connections, etc., between entities or components. For example, bi-partite graphs have been the focus of a broad spectrum of studies spanning from document analysis to bioinformatics. A bi-partite graph paradigm may indeed be relied upon to represent various kinds of relationships, e.g., customers that buy products, people interactions or friendships in a social network, etc. Such data typically are provided in very large amounts that need to be processed in the most efficient way. The processing of such very large amounts of data quickly and efficiently is a challenge using conventional methodologies.

SUMMARY

Various embodiments provide a method for determining entities and attributes dependencies, computer system and computer program product as described by the subject matter of the independent claims. Advantageous embodiments are described in the dependent claims.

Embodiments of the present invention can be freely combined with each other if they are not mutually exclusive.

In one aspect, the invention relates to a computer-implemented method. The method comprises:

a. providing a data structure representing a matrix having rows representing entities and columns representing attributes of the entities;
b. assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix;
c. providing a multiprocessor unit comprising streaming multiprocessors, each being configured for executing at least one respective thread block, the thread block comprising a predefined number of threads;
d. determining a gradient vector of a likelihood function for finding optimal values of the affiliations vectors $f_u$ and $f_i$, wherein the gradient vector comprises for a given attribute i a first term comprising $\Sigma_{u:r_{u,i}=1} G(f_u,f_i)$ or $\Pi_{u:r_{u,i}=1} G(f_u,f_i)$, where the sum and multiplication are over entities that have a dependency with the attribute i;
e. initializing the first term using a predefined value and storing the initialized first term in a main memory of the multiprocessor unit;
f. for each entity of the sum or of the multiplication of the first term of the given attribute:
  launching (or assigning) a thread block for the entity-attribute pair (u, i);
  evaluating the function $G(f_u,f_i)$ using the threads of the thread block;
  selecting a thread of the thread block, wherein the selected thread is configured for adding or multiplying the evaluated first term (or the evaluated function) of the entity to the current value of the first term in the main memory unit using an atomic operation.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system comprising a multiprocessor unit comprising streaming multiprocessors, each being configured for executing at least one respective thread block, a thread block comprising a predefined number of threads, the computer system further comprising a data structure representing a matrix having rows representing entities and columns representing attributes of the entities. The computer system is configured for assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix; determining a gradient vector of a likelihood function for finding optimal values of the affiliations vectors $f_u$ and $f_i$, wherein the gradient vector comprises for a given attribute i a first term comprising $\Sigma_{u:r_{u,i}=1} G(f_u,f_i)$ or $\Pi_{u:r_{u,i}=1} G(f_u,f_i)$, where the sum and multiplication are over entities that have a dependency with the attribute i; initializing the first term using a predefined value and storing the initialized first term in a main memory of the multiprocessor unit; for each entity of the sum or the multiplication of the first term of the given attribute:
  launching a respective thread block for the entity-attribute pair (u, i);
  evaluating the function $G(f_u,f_i)$ using the threads of the thread block;
  selecting a thread of the thread block, wherein the selected thread is configured for adding or multiplying the evaluated first term of the entity to the current value of the first term in the main memory unit using an atomic operation.

In another aspect, the invention relates to a computer implemented method. The method comprises: providing a data structure representing a matrix having rows representing entities and columns representing attributes of the entities; assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix; providing a multiprocessor unit comprising streaming multiprocessors, each being configured for executing at least one respective thread block, the thread block comprising a predefined number of threads; determining a gradient vector of a likelihood function for finding optimal values of the affiliations vectors $f_u$ and $f_i$, wherein the gradient vector comprises for a given attribute i a first term comprising $$\min_{u:r_{u,i}=1} G(f_u, f_i) \text{ or } \max_{u:r_{u,i}=1} G(f_u, f_i),$$

or $$\max_{u:r_{u,i}=1} G(f_u, f_i),$$

where the minimum and maximum are for entities that have a dependency with the attribute i; initializing the first term using a predefined value and storing the initialized first term in a main memory of the multiprocessor unit; for each entity of the minimum or of the maximum of the first term of the given attribute:

launching (or assigning) a thread block for the entity-attribute pair (u, i);

evaluating the function $G(f_u, f_i)$ using the threads of the thread block;

selecting a thread of the thread block, wherein the selected thread is configured for determining a minimum or a maximum of the evaluated function of the entity and the current value of the function in the main memory and storing the determined minimum or maximum in the main memory unit using an atomic operation, wherein the stored minimum or maximum becomes the current value.

BRIEF DESCRIPTION OF THE SEVERAL VIEWS OF THE DRAWINGS

In the following embodiments of the invention are explained in greater detail, by way of example only, making reference to the drawings in which:

FIG. 5 illustrates a simplified example of a method for determining dependencies between users and items.

DETAILED DESCRIPTION

Figure 1:
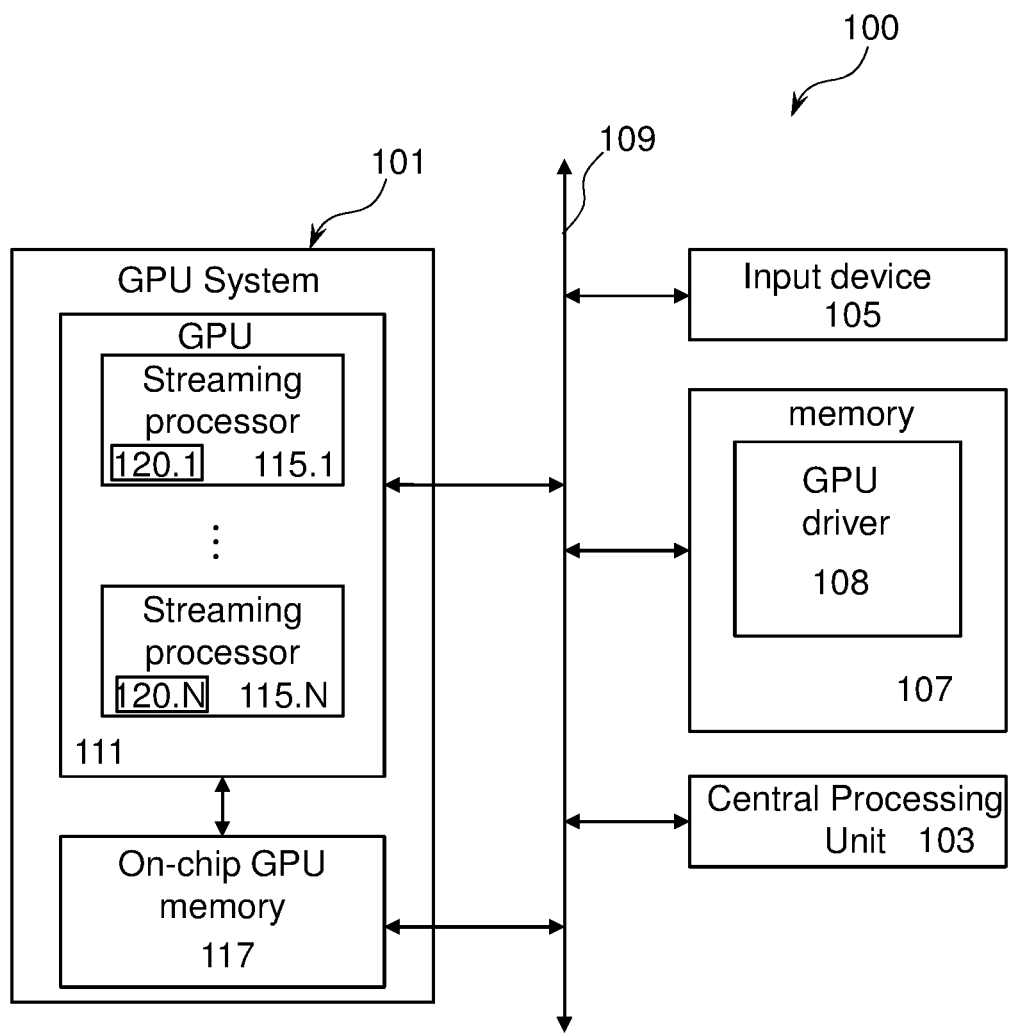
FIG. 1 is a block diagram of a computing system in which the one or more aspects of the invention may be implemented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may be provided for creating recommendations of items or entities, e.g. for products, items, users or other types of entities using a highly scalable architecture. For example, a user may be recommended an item if the probability model of the present method finds out that the user may relate to or may need the item although the user has no contact or access to the item before the method is performed. The present method provides an efficient way for processing the probability model using a multiprocessor unit.

Each entity of the entities of the data structure may comprise a user and each attribute of the attributes of the data structure may comprise an item. A cell of the matrix may be formed by a component pair comprising an entity and an attribute.

The multiprocessor unit comprises for example a graphical processing unit (GPU).

The matrix may be referred to as matrix R, where the rows correspond to entities (e.g., users) and the columns correspond to attributes (e.g., items). If the $(u,i)^{th}$ element of R takes a value $r_{ui}=1$ this indicates that entity u had access to or depends on attribute i (e.g., the user had used services provided by item i or the user u is dependent on item i). It is assumed that all values $r_{ui}$ that are not positive (e.g., not equal to 1, $r_{ui}=1$) are unknown (e.g., $r_{ui}=0$) in the sense that user u might be interested in item i or not. A cell of the matrix R may be an unknown cell if it comprises value $r_{ui}=0$. The present method may enable to identify items (by evaluating the probability model described below, which evaluation is based on evaluation of the gradient vector) in which a user u is likely to be interested in. This may allow to provide users with targeted items. Put differently, the positives may be found among the unknowns from positive examples only.

The present method may enable a combination of hardware and software with the purpose of leading to fast recommendations. The recommendations consist of recommending that a user may relate or may need access to an item although the dependency or the relation between that user and that item is initially unknown. The combination of hardware and software can lead to almost real-time recommendation discovery on very large datasets. In addition, since recommendation can be very fast generated, the present method can be used in a SaaS solution, where the user or clients uploads their dataset and receives back immediately the recommendations.

An entity (e.g., user) and an attribute (e.g., item) may be dependent (or related to each other) components. The term "dependent components" is used herein to refer to components that interact with or otherwise depend on each other for their functionality. In particular, a first component may rely upon the data and/or operations of a second component such that the first component may not operate properly without the second component's execution and/or data. For example, the first component may execute a function that utilizes input variables generated by the second component. In another example, the first (second) component may have access or may use services provided by the second (first) component. When a first component requires data and/or operations and/or services from a second component, the first component is referred to as being dependent upon the second component.

The data structure may for example be used to model a technical system such as the Internet (e.g., each node represents a router and each edge represents a connection or dependencies between routers). The technical system may be a system or an assembly of the first and second components that are at least partially united in a form of interactions or dependencies to form an organized whole. For example, in computer field, the technical system may represent a logical connection of computers, peripherals, software, service routines, terminals and/or end-users which are organized to achieve a certain goal or to provide a given service or function.

For example, the users and items may be part of a mobile telecommunication service provider system e.g. LTE system, where the items comprise the base stations and the users comprise mobile devices. In this example, a mobile device may depend on a base station if the mobile device had access to the cell that is serviced by the base station i.e. the mobile device has been serviced by the base station.

In another example, the allocation of (large) data chunks P vs. processor cores C (or simply "cores", for short), or more generally network nodes, etc. may be used, where the data chunk P may be the first component (entity) and the nodes may be the second components (attribute). Assuming a bipartite graph of nodes C versus data P, where the existence of an edge indicates that a core has accessed the particular data P e.g. that core depends on data P. Data P could for instance be very large data chunks, distributed amongst a large set of nodes. Yet, the concept of component pairs used herein could be applied to various types of pairs of components e.g. cast into subjects vs. variables, parameters vs. parameter values, etc. The information recorded in the graph can also been conveyed in an adjacency matrix, updated in real-time, if necessary, and containing the value of 'one' at position [i, j] if there exists an edge between the nodes i and j, otherwise the value is 'zero.' Applications may notably extend to servers vs. clients, customers vs. products, etc.

At least part of the present method may be based on the intuition that there exist groups, clusters, or communities of users that are interested in a subset of the items (a user is interested in an item means that the user may have accessed or used a service of the item). Such clusters may be called co-clusters as they consist of both users and the items in which the users in the cluster are interested in. The terms "cluster" and "co-cluster" may be used interchangeably herein. As users can have several interests, and items might satisfy several needs, each user and item may belong to several co-clusters. Contrary, a co-cluster must contain at least one user and one item, and can therefore not consist of users only or items only.

Predicting or estimating dependencies for the cells of unknown dependencies may be advantageous as it may enable prior actions for controlling the function of the system of first and second components. Prior actions may have the advantage of saving system resources that would otherwise be required for a posterior action, namely, for detecting a dependent component after the dependency has occurred and for adapting the system accordingly. For example, in case of a network of users and items, the prediction may be used in order to prevent an eventual network congestion by reserving in advance network resources for the pairs of users and items of the identified cells.

In another example of social networks of users, the present method may enable reserving resources such as storage resources for the pairs of dependent users as these resources may be required by those users when initiating the connection or the dependency between them. Without doing that the system may run out of resources after the users have started their contact, which may cause system failures etc.

Another advantage may be that the present method may provide a secure access to the system of users and items by preventing malicious access to the system. For example, the users and items may comprise trusted and untested components. By identifying that some untrusted components may have access or may depend on other trusted components, those untrusted components may be prevented beforehand for performing such access. According to one embodiment, wherein $G(f_u, f_i) = f_u(1 - e^{-(f_u, f_i)})^{-1}$, wherein evaluating the function $G(f_u, f_i)$ comprises:

splitting the N elements of the inner product $<f_u, f_i>$ according to the predefined number of threads of the thread block of the entity;

processing by each thread of the threads of the thread block the respective assigned elements of the inner product, the result of the processing being stored in a shared memory of the multiprocessor unit;

summing the results stored in the shared memory;

evaluating the function for the entity by using the summed results and the affiliation vector $f_u$ of the entity.

According to one embodiment, the method further comprises repeating steps d) through f) (of the summary section) for each attribute of a cell of the matrix having a dependency value, thereby evaluating the probability model for multiple attributes. This may enable to evaluate the gradient vector for all attributes (and dependent entities) in parallel. For example, each attribute may be assigned to a respective thread block, wherein the processing of the iterations of step f) may be performed by respective thread blocks in parallel. In other words, each entity-attribute pair (u, i) may be processed by a respective thread block. For example, if there are two items i1, i2, each item may have a list of users that depend on the item (e.g. they have a value $r_{ui}=1$ in matrix R) e.g. i1 has three users that depend on and i2 has four users that depend on. In this case, 7 pairs of user-item can be defined and each of the 7 pairs may be assigned to a respective thread block resulting in 7 thread blocks. In one example, the 7 thread blocks may run in parallel. In another example, the three threads of item i may run in parallel and the four threads of item i2 may run in parallel independently of the three thread blocks of i1. The 7 thread blocks may be processed by one or more streaming multiprocessor.

According to one embodiment, wherein the evaluating of the probability model for the multiple items is asynchronously performed.

These embodiments may take the advantage of the fact that the present probability model including the gradients are expressed for separately for each attribute. This may enable the evaluating of the probability model and in particular of the gradients item per attribute in a most efficient way.

According to one embodiment, wherein the evaluating of the probability model is performed in parallel for the entities that have a dependency with the given attribute i. This may further speed up the process of evaluating the probability model by adapting the calculation to the multiprocessor unit structure.

According to one embodiment, the splitting of the N elements further comprises: controlling the threads of the thread block to synchronously (e.g. at the same time) process a set of elements of the N elements, wherein the set of elements are stored in contiguous memory regions of the main memory. This may further speed up the process of evaluating the probability model.

According to one embodiment, the selected thread being a randomly selected thread. This may further speed up the process of evaluating the probability model compared to the case where the thread has to be a specific one that has to be selected. For example, the selected thread may be the first thread found by the system.

According to one embodiment, the method further comprises: determining the initial number of clusters based on the number of threads per thread block. This may further speed up the process of evaluating the probability model, because the processing of the probability model is adapted to the structure of the GPU. For example, if the number N of clusters is equal to the number of threads then each thread may compute a respective one term of the inner product.

According to one embodiment, the method further comprises: determining the initial number of clusters such that a same number of elements of the inner product is assigned to a respective thread of the thread block. This may be advantageous as it may enable a maximum utilization of streaming processor resources. This is by contrast where each thread may process different number of elements and thus may require a control per thread level.

According to one embodiment, the same number of elements comprising one or more elements. This may for example enable the scheduling the N elements on a single thread block.

According to one embodiment, the method further comprises: determining a probability model using the affiliations vectors $f_u$ and $f_i$ as parameters, wherein the probability model presents the probabilities for an entity of the entities to depend on an attribute of the attributes, wherein the probability model is given by the following equation: $1-e^{-\langle f_u, f_i \rangle}$, wherein parameters of the probability model are estimated by computing a minimum of the likelihood function defined by following equation Q subject to $[f_u]_c, [f_i]_c \geq 0, \forall_c$:

$$Q = -\log \mathcal{L} + \lambda \Sigma_i \|f_i\|_2^2 + \lambda \Sigma_u \|f_u\|_2^2, \text{ where}$$

$$\log \mathcal{L} = -\Sigma_{(u,i):r_{ui}=1} \log(1-e^{-\langle f_u, f_i \rangle}) + \Sigma_{(u,i):r_{ui}=0} \langle f_u, f_i \rangle,$$

and $\lambda \geq 0$ is a regularization parameter, where c runs over each cluster of the N clusters, wherein the gradient vector is defined as follows:

$$\nabla Q(f_i) = -\Sigma_{u:r_{ui}=1} f_u (1-e^{-\langle f_u, f_i \rangle})^{-1} + \Sigma_u f_u + 2\lambda f_i,$$

where $r_{ui}=1$ indicates a dependency between entity u and attribute i, and $r_{ui}=0$ indicates an unknown dependency between entity u and attribute i. An unknown dependency means that the entity u may or may not depend on attribute i.

According to one embodiment, the predefined value comprises a value of the second term $\Sigma_u f_u + 2\lambda f_i$ of the gradient vector. For simplicity of the description, the equation $\Sigma_u f_u + 2\lambda f_i$ is referred to as the second term (single term that comprises two sub terms). This may enable the computation of the gradient vector at once. In another example, the two terms of the gradient vectors may be evaluated in parallel. In this case, the predefined value may for example be 0 or other value.

According to one embodiment, the method further comprises using the evaluated probability model to identify unknown cells of the matrix whose associated attributes and entities depend on each other, wherein each unknown cell is formed by the given attribute i and an entity of the entities and has a value indicative of unknown dependency.

The identified cells may be communicated to a user of the present method and a notification as part of a recommendation or notification message may be displayed or sent indicating the identified cells. A motivation for such recommendation that is based on finding user-item co-clusters including overlapping user-item co-clusters is that such an approach may offer an interpretable model: identification of sets of users that are interested in or may have access to a set of items, allows not only the inference of latent underlying patterns but can also lead to better and useful interpretable notifications.

The present method may identify overlapping user-item co-clusters and generate notifications. The models' parameters are factors associated with users and items. Specifically, suppose there are N co-clusters (e.g., N can be determined from the data via cross validation).

Cluster affiliation of user u and item i is modelled by the non-negative N-dimensional co-cluster affiliation vectors $f_u$ and $f_i$, respectively, where $[f_u]c=0$ signifies that user u does not belong to co-cluster c, and $[f_u]c>0$ is the affiliation strength of user u with co-cluster c.

According to one embodiment, the data structure is a two-dimensional array of scalar elements, which captures dependencies between at least $10^4$ components, preferably $10^5$ components. This may enable processing large data such as Big Data in a single process, which may then be efficient and fast.

According to one embodiment, the data structure is representable as an adjacency matrix of a bipartite graph, preferably a bipartite graph of components versus component attributes.

According to one embodiment, the probabilities for an entity to depend on an attribute comprises the probability that at least one of: the entity accesses data of the attribute; the entity requests a service of the attribute.

FIG. 1 is a block diagram of a computing system 100 in which the one or more aspects of the invention may be implemented. The computing system 100 includes a system data bus 109, a central CPU 103, input devices 105, a system memory 107, a graphics processing unit (GPU) system 101 including a GPU 111. The system data bus 109 connects the CPU 103, the input device 105, the system memory 107, and the GPU system 101.

The CPU 103 receives user input from the input device 105, executes programming instructions stored in the system memory 107, operates on data stored in the system memory 107, sends instructions (to perform a work) and/or data to GPU 111 to complete and configures needed portions of the GPU system 101 for the GPU 111 to complete the work.

The system memory 107 may for example include dynamic random access memory (DRAM) used to store programming instructions and data for processing by the CPU 103 and the GPU system 101. The system memory 107 may for example comprise a GPU driver 108. The GPU driver 108 may cache a GPU programming code to the on-chip GPU memory 117 via the system data bus 109.

The GPU 111 receives the transmitted work from the CPU 103 and processes the work. The GPU 111 completes the work in order to render and display graphics images on a display device. A graphics pipeline 115 of the GPU 111 is employed for processing the work.

The GPU system 101 includes the GPU 111, an on-chip GPU memory 117 and an on-chip GPU data bus 119. The GPU 111 is configured to communicate with the on-chip GPU memory 117 via the on-chip GPU data bus 119. As noted above, the GPU 111 can receive instructions from the CPU 103, process the instructions in order to render graphics data and images, and store these images. Subsequently, the GPU 111 may display certain stored graphics images on a display device.

The GPU 111 includes one or more streaming multiprocessors (SMs) 115. Streaming multiprocessor SM 115 is an execution unit operable to execution functions and computations for graphics processing. Each SM of streaming multiprocessors 115 may for example comprise multiple cores. Each SM of streaming multiprocessors 115 can execute on its hardware a number of thread blocks where each thread block consists of a number of threads (e.g. 32 threads to execute in parallel in lock step). For example, 48 thread blocks can be assigned per multiprocessor SM.

Each SM of streaming multiprocessors 115 may comprise a memory 120 that can be shared by the threads within the same thread block that is assigned to the SM. Blocks of threads are for example serially distributed to all the SMs. For example, a thread block of threads may be assigned to a respective SM of the streaming processors e.g. all the threads in one thread block may be executed on the same SM. Each SM launches warps of e.g. 32 threads. Hence, a thread block may be divided into some number of warps if the number of threads in a block is more than 32. Since all the threads share the registers and shared memory within an SM, the number of blocks that can be scheduled on one SM may be limited by the usage of registers and shared memory. All threads in a warp execute the same instruction when the warp is selected for execution. A warp scheduler schedules warps onto SMs as they are ready to run. If there are fewer blocks than the number of SMs, then some SMs may be idle. If the number of blocks is not divisible by the number of SMs, then the workload on some SMs may be higher than the others.

The on-chip GPU memory 117 is configured to include GPU programming code and on-chip buffers. The GPU programming may be transmitted from a GPU driver 108 of the system memory 107 to the on-chip GPU memory 117 via the system data bus 109.

Figure 2:
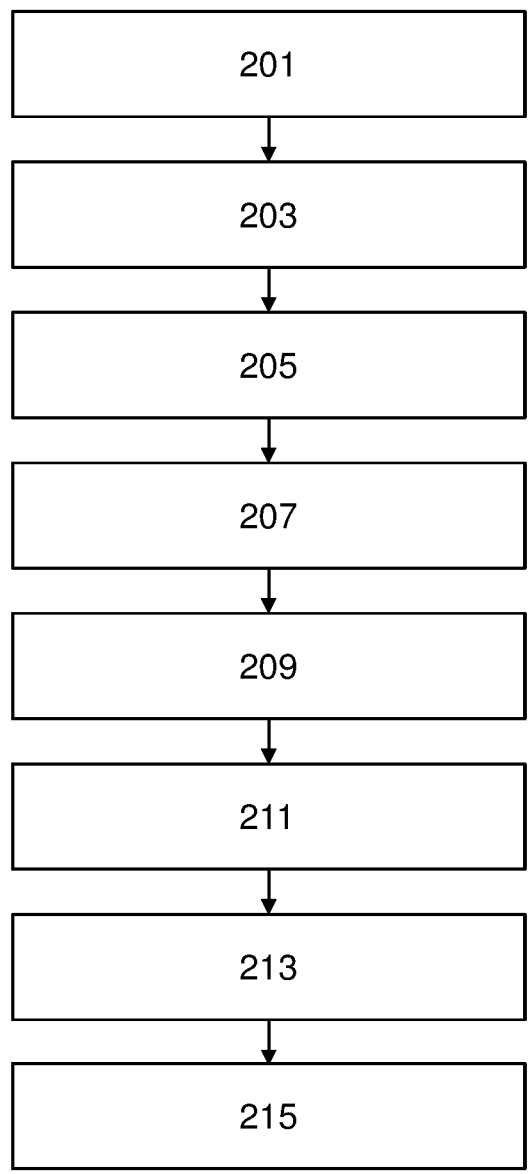
FIG. 2 is a flowchart of a method processing a data structure.

FIG. 2 is a flowchart of a method for processing a data structure. The term "data structure" as used herein refers to a scheme for organizing related pieces of information. For example, the data structure may comprise a two-dimensional array. The data structure may for example represent a dependency matrix (or a matrix) R having a plurality of columns representing respective first components (e.g., items) and a plurality of rows representing respective second components (e.g., users).

A matrix may consist of a grid with cells. Each of the cells may be empty or may contain a scalar element. Scalar elements typically comprise numerical values, i.e., binary (0 or 1), real, complex numbers or strings, or more generally anything that can be converted to numbers for a sensible comparison. A value of a cell of the matrix may relate a first component i to a second component u, or more generally a pair of values (u,i) that indicates that u and i are connected or related to each other. For instance, dependencies between the first and second components may be represented in a binary form, with e.g., a value of 1 meaning that there is a dependency between two components, while 0 indicates no known dependency between the two components. More complex relations can however be captured by real values, where the actual value indicates e.g., an intensity or level of the dependency, a polarization of dynamic of the dependency (thanks to +/− sign), etc. More complex dependencies could still be captured thanks to complex numbers, a thing that incidentally would not prevent from calculating intra-block densities e.g., based on sum of absolute values of the scalar elements.

A first component of the first components depends on a second component of the second components if for example the second component has access to a service that is provided by the first component or vice versa.

The first and second components may be components of a service provider system such as mobile telecommunication service provider system, where the first components may comprise base stations and the second components may comprise mobile telecommunication devices. The dependency between the first and second components may comprise for example that the second component has been previously serviced by the base station.

The first components may for example comprise service providers such as application service providers that may provide services over a network for users or nodes. The second components may comprise the users or nodes of the network.

In step 201, each cell of the matrix may be assigned a value indicative of the level or intensity of dependency or indicative of an unknown dependency of a pair of first and second components forming the cell. For example, a cell having value 0 may indicate that the pair of the first and second components of the cell are not dependent or that their dependency is unknown.

The assigned values may for example be obtained from or using history data describing previous operations of the first and second components. In another example, the assigned values may be received from one or more users of the first and second components.

For example, step 201 may be performed on a periodic basis e.g. to take into account updates in the dependencies between the first and second components.

In step 203, each component of the first and second components may be assigned a respective affiliation vector $f_u$ and $f_i$. The affiliation vectors $f_u$ and $f_i$ may indicate the strength of affiliation of the component to N predefined initial clusters of cells of the matrix. The N initial number of clusters may be randomly chosen. In another example, the N initial number of clusters may be user defined.

The affiliation vectors $f_u$ and $f_i$ may have a dimension N that corresponds to the number N of the initial clusters. For example, $f_u$ and $f_i$ may each comprise a data structure having N elements each associated with a respective cluster of the N initial clusters. For example, the number of clusters N may be determined from data via cross validation. The N clusters may be smaller than the number of items and smaller than the number of users. Cluster affiliation of a second component u and first component i may be modelled by a non-negative N-dimensional cluster affiliation vectors $f_u$ and $f_i$, respectively, where $[f_u]c=0$ signifies that second component u does not belong to cluster c, and $[f_u]c>0$ is the affiliation strength of u with cluster c.

For example, the higher the number of second components that depend on a same first component in a given cluster the higher the strength of affiliation of that first component to the given cluster. The higher the number of first components that depend on a same second component in a given cluster the higher the strength of affiliation of that second component to the given cluster. I other words, $f_u$ and $f_i$ may be latent factors which represent the degree of membership of a respective component to the N initial clusters.

In step 205, the affiliation vectors $f_u$ and $f_i$ may be initialized with predefined values e.g. with values larger than zero or random values or any other values.

In step 207, a probability model may be determined using the affiliations vectors $f_u$ and $f_i$ as parameters of the model. The probability model presents the probabilities for a first component of the first components to depend on a second component of the second components.

In one example, if a second component u and first component i both lie in cluster c, then this cluster may generate a positive example with probability $1-e^{-[f_u]c[f_i]c}$, and assuming that each cluster c=1; . . . ; N, generates a positive example independently, it follows that $$1-P[r_{ui}=1]=\Pi_c e^{-[f_u]c[f_i]c}=e^{-<f_u,f_i>},$$

where $<f,g>=\Sigma_c[f]_c[g]_c$ denotes the inner product in $\mathbb{R}^N$. Thus the probability model may be determined as follows:

$$P[r_{ui}=1]=1-e^{-<f_u,f_i>},$$

which represents the probability of u to depend on i.

Upon determining the probability model, the parameters $f_u$ and $f_i$ may be learned or fitted. This may for example be done as described in steps 209-213. In step 209, the parameters of the probability model may be estimated for a plurality of different numbers of clusters starting from the initial number N of clusters. In step 211, a score may be computed (e.g., a likelihood score as described below) for the parameters of the probability model estimated for each of the plurality of different numbers clusters. And in step 213, the parameters of the probability model with the highest computed score may be selected. The selected parameters $f_u$ and $f_i$ may or may not have the dimension of N. Further details on the parameters determination is described below.

In step 215, the selected parameters of the probability model may be used to identify cells of unknown dependencies ($r_{ui}=0$) pairs of first and second components that depend on each other. For that, the values of the selected parameters may be used to evaluate the probability model for each pair of first and second components of the matrix. For example, a cell that has assigned value 0 at the beginning in step 201 may be identified if the probability that the first component depends on the second component of that cell is higher than a given threshold. This threshold may for example be equal to 0, 0.5 or 0.7.

In order to determine the vectors $f_u$ and $f_i$ a training of data (e.g. of the matrix R) may be performed. The training involves the computation of gradient vectors that are used to update the $f_u$ and $f_i$. For item i the gradient is given by the equation Eqt Gr described below:

$$\nabla Q(f_i) = -\sum_{u:r_{ui}=1} f_u \frac{e^{-\langle f_u, f_i \rangle}}{1 - e^{-\langle f_u, f_i \rangle}} + \sum_{u:r_{ui}=0} f_u + 2\lambda f_i, \quad \text{Eqt Gr}$$

The equation Gr may be expressed as:

$\nabla Q(f_i) = -\Sigma_{u:r_{ui}=1} f_u (1 - e^{-\langle f_u, f_i \rangle})^{-1} + \Sigma_u f_u + 2\lambda f_i$, The first term of the equation Gr requires the computation of a summation which may require a huge amount of processing resources. The first term of the equation Gr comprises a non-linear function of the inner product between the $f_u$ and $f_i$ vectors (taking the product of all indices and then summing them up). The sum of the first term is not over all users but only over the users that have dependency to item i (users u having $r_{ui}=1$ with item i). There is also no summation over i; instead this formula may be evaluated independently for every possible value of item i.

The second term of the equation Gr. may be expressed as $C+2\lambda f_i$, where C is a constant independent of the item index. An initial computation may be performed to calculate the sum of all $f_u$ vectors of the second term and the gradient vector of Equation Gr may be initialized in GPU memory as $C+2\lambda f_i$. A kernel function may then be called which launches a thread block for every positive rating ($r_{ui}=1$) in the training data (matrix R). Since this number is typically very large, this mapping is well suited to the massively parallel GPU architecture in which a number of streaming multiprocessors are capable of executing multiple thread blocks concurrently.

Figure 3:
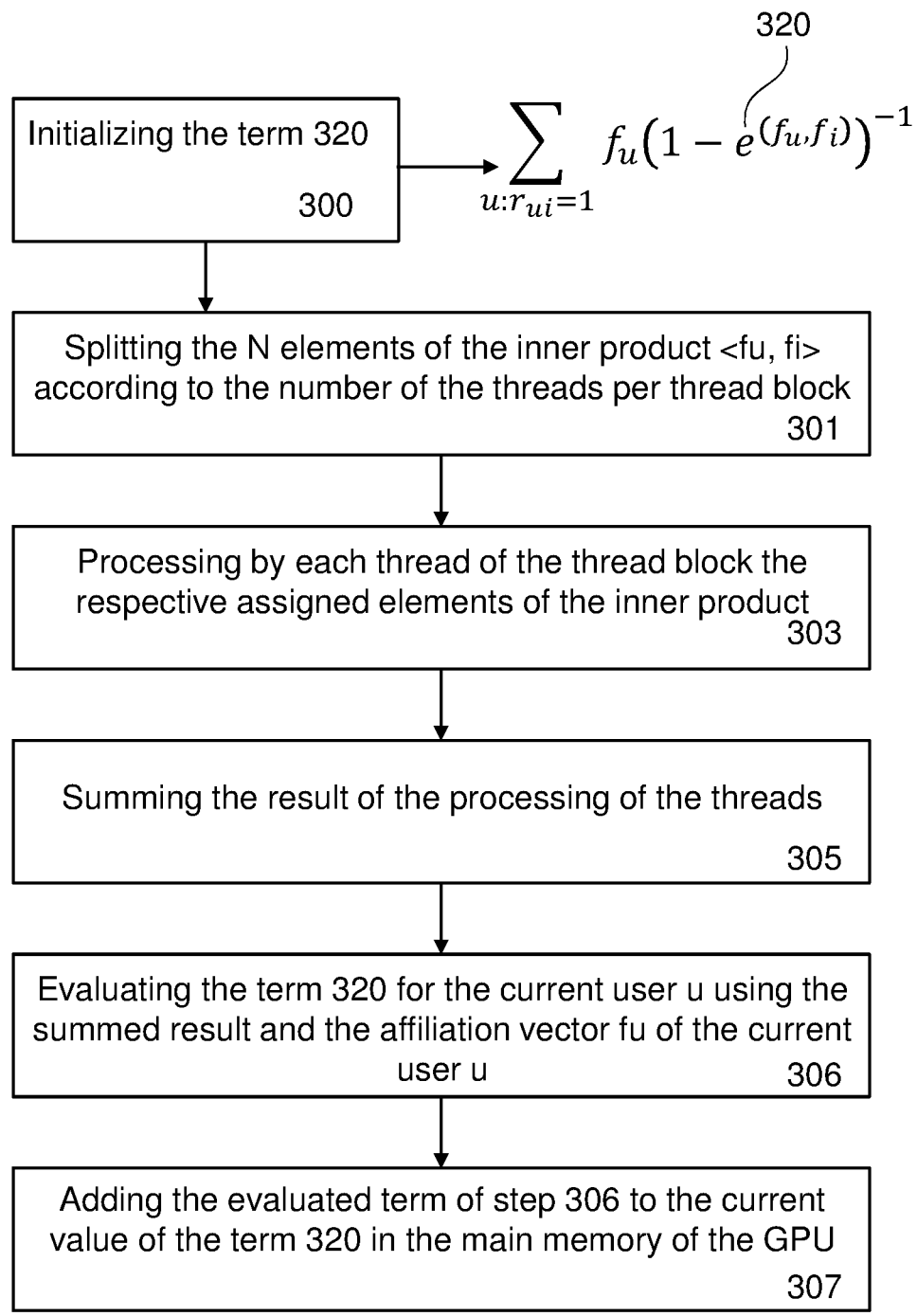
FIG. 3 is a flowchart of a method for evaluating the term $\Sigma_{u:r_{u,i}=1} f_u (1-e^{-(f_u, f_i)})^{-1}$.

FIG. 3 is a flowchart of a method for evaluating the term 320, $\Sigma_{u:r_{ui}=1} f_u (1-e^{-\langle f_u, f_i \rangle})^{-1}$ of the above equation Eqt. Gr. The evaluation may be performed on a massively parallel processor such as a GPU system 101. For each user u of the sum of term 320 a thread block of the GPU system 101 may be assigned.

The entire training data (e.g., in a sparse format) is copied from the host memory 107 into the GPU main memory 117 along with a set of initial values for the $f_i$ and $f_u$ vectors. The training data comprise the matrix R.

For example, the CPU 103 copies the vectors $f_u$ and $f_i$ into the GPU main memory 117 and CPU 103 launches at least one kernel function for evaluating the first term e.g. for all items. For example, multiple kernel functions may be used to evaluate the first term (even for a single item) in case a thread block is used for every item-user dependent pair.

In step 300, the term 320 may be initialized using a predefined value. The initialized term 320 may be stored in the main memory 117. The predefined value may for example be the value of the second term $C+2\lambda f_i$ of the equation Eqt. Gr. For simplicity of the description the equation $C+2\lambda f_i$ is referred to as a single term (the second term) although it comprise two sub terms C and $2\lambda f_i$. This may enable the evaluation of the whole gradient as defined by equation Eq. Gr. In another example, the predefined value may be 0 or other values. This may enable a separate evaluation of the term 320 of the gradient independent of the term $C+2\lambda f_i$, e.g. such that the two terms can be evaluated in parallel.

Steps 301-307 may be performed to calculate the partial sum of the first term for a particular pair of user u and item i(u, i). A respective thread block may be designated for the pair (u,i).

In step 301, the N elements of the inner product $\langle f_u, f_i \rangle$ may be split according to the predefined number of threads per thread block. The N elements of the inner product $\langle f_u, f_i \rangle$ comprise $f_u[0]*f_i[0], f_u[1]*f_i[1] \ldots, f_u[N]*f_i[N]$, where N is the number of co-clusters. If for example each thread block is assigned N threads, then each thread j of the thread block may process the respective value of $f_u[0]*f_i[i]$. In another example, each thread of the thread block may be assigned more than one element of the inner product. For example, each thread may process respective two elements: $f_u[0]*f_i[0]+f_u[1]*f_i[1]$. Another example of splitting the N elements on the threads of thread block is provided with reference to FIG. 4.

In step 303, each thread of the thread block may process the respective assigned elements of the inner product. The result of the processing is stored by each thread in a shared memory e.g. 120.1 of the SM 115.1 to which the thread block is assigned. The processing may be performed in parallel as the N elements are assigned to threads of a single thread block.

In step 305, the results stored in the shared memory 120.1 may be summed up.

In step 306, the term 320 may be evaluated for the (current) user u by evaluating the nonlinear function $(1-\exp(\text{Sum}))^{(-1)}$ using the summed result (Sum) of step 305 and by multiplying the evaluated nonlinear function with the affiliation vector $f_u$ of the current user u. The affiliation vector $f_u$ of the current user u may be read from the main memory 117 where it is stored.

In step 307, a selected thread of the thread block may add the evaluated term of step 306 to the current value of the term 320 in the main memory 117 of the GPU system 101 using an atomic operation. This may result in a new value of the term 320 in the main memory 117.

Steps 301-307 may be performed or repeated for each user u of the sum of the term 320 and each user u may be assigned a respective thread block. This may enable for example the parallel processing for all users using the thread blocks.

In one example, the method of FIG. 3 may be performed for each item of the matrix R that is associated with a value $r_{ui}=1$. For example, if one or more cells of a given column of the matrix have $r_{ui}=1$, the item that is represented by the column may be processed with the method of FIG. 3.

The evaluation of the gradient vector may enable finding the optimal values of $f_u$ and $f_i$. For example, an iterative training algorithm described may be performed by calculating the gradient vector multiple times using the method described herein. The calculation may for example be performed by launching a sequence of kernel functions. Throughout the training, all data remains on the GPU system 101 and communication back and forth between the host (including the CPU 103 and memory 107) and the GPU system 101 is limited to a small amount of control logics. Once a predetermined set of iterations have been executed, the learned values of the $f_i$ and $f_u$ are copied back from the GPU system to the host memory 107 and the training is completed.

Figure 4:
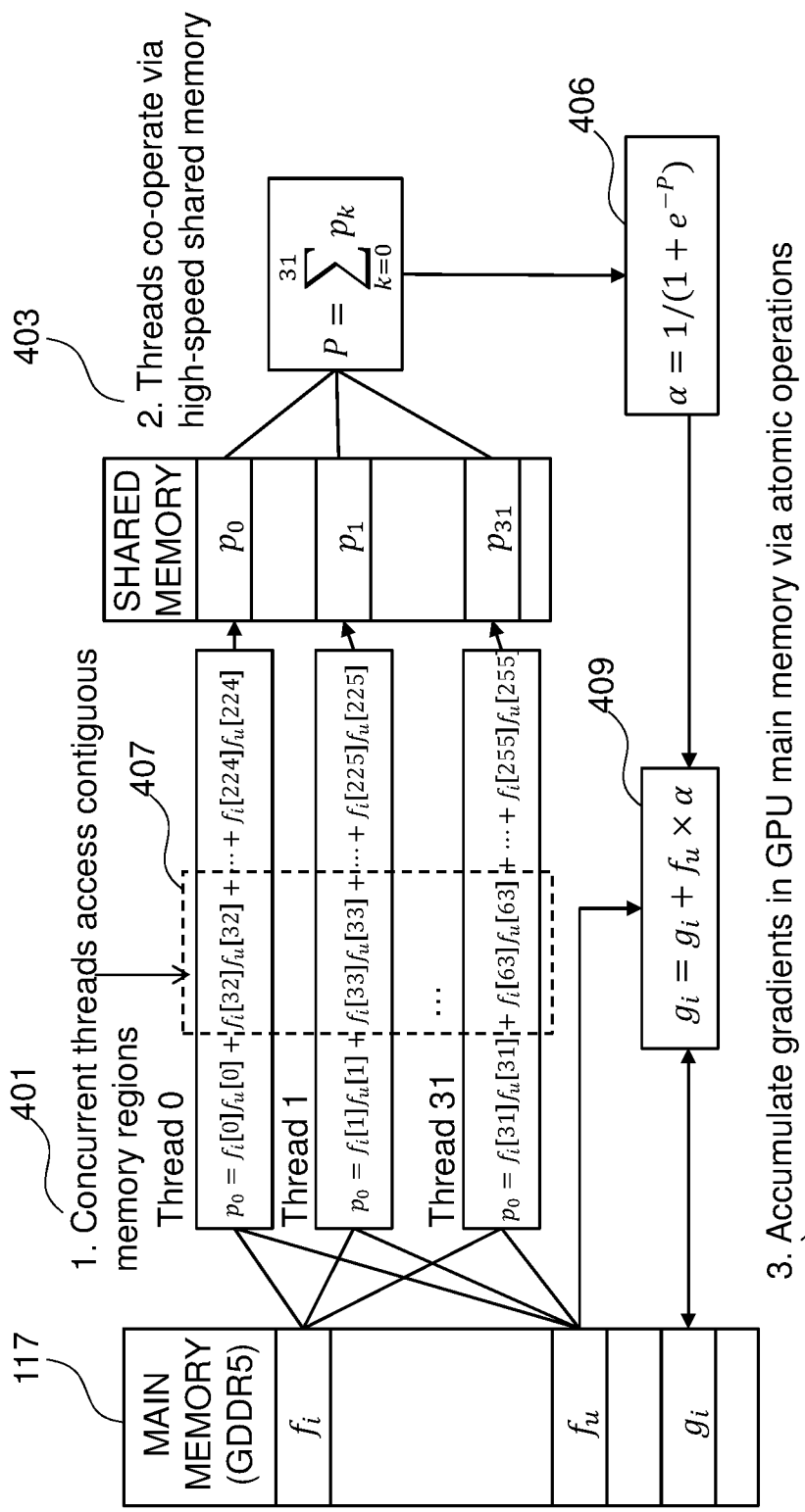
FIG. 4 illustrates an example method for evaluating the term $\Sigma_{u:r_{u,i}=1} f_u (1-e^{-(f_u, f_i)})^{-1}$.

FIG. 4 illustrated an example method for evaluating term 320 using a GPU 111 whose thread blocks can run up to 32 threads. In this example, the number N of co-clusters is 256. FIG. 4 illustrates the calculation of the term 320 for a single user (i.e., a single element of the sum over users of term 120).

In this example, the gradients are computed on a massively parallel processor (such as a GPU system 101) by scheduling a thread block to compute the partial sums of term 320 for each item. This corresponds to executing a number of thread blocks equal to the total number of ratings in the training data. This is typically a very large number, and is thus well-suited for computation using massively parallel hardware. The training data may comprise the matrix R, where a rating comprises a value which is different from 0 in the matrix R. Each rating may thus involve a cell of the matrix, which cell is formed by a user and a rated item. And the term 320 corresponds to an item of those rated items. For example, if a cell of the matrix R formed by user u and item x has value 1, the gradient of equation Eqt. Gr. May be defined for item x such that the corresponding term 320 can be processed with the present method.

FIG. 4 illustrates the computation performed by a single thread block in more detail. The thread block first fetches the corresponding $f_i$ vector and $f_u$ vector from GPU main memory 117 and computes the inner product between the two. An individual thread within the thread block handles computation of only part of the inner product. The memory access patterns are carefully arranged so that threads that are executed concurrently access contiguous regions of memory, allowing reads to be effectively coalesced. The partial results are then stored in high-speed shared memory 120 and a reduction is performed to obtain the final value of the inner product (P). A single thread within the block then computes the scalar $\alpha$. Finally, the thread block multiplies this scalar by the $f_u$ vector and updates the corresponding item gradient in GPU main memory 117 using atomic operations. In this manner, the sum in equation Eqt. Gr. may be computed entirely asynchronously for all items. Once all the thread blocks have finished execution, the correct value of the gradient vector exists in GPU main memory 117 and the training can proceed.

In this example of FIG. 4, a thread block may be assigned to a given item (to be processed), which means that the term 320 may be evaluated for all users that depend on the given item by the thread block. Vectors $f_u$ and $f_i$ of the term 320 may be stored in the GPU memory 117.

Within the thread block, a certain number of threads (e.g. 32) of a thread block of the thread block compute the partial inner product $<f_u,f_i>$ and write their result into the shared memory 120 of the GPU system 101. The inner product $<f_u,f_i>$ in this example has 256 elements. Since there are only 32 threads, each thread is then assigned 8 (=256/32) elements of the inner product $<f_u,f_i>$. For example, the thread 0 is assigned the sum of 8 elements $f_u[0]*f_i[0]+f_u[32]*f_i[32]+\ldots+f_u[224]*f_i[224]$. The result p0 of this sum is stored by thread 0 in the shared memory 120.

Each thread may use indices such that the thread can access the corresponding data in the GPU main memory. For example, the thread 0 may use indexes 0, 32, 64, 96, 128, 160, 192, 224 as follows:

index i=0 is defined;
$f_u[0]*f_i[0]$ is calculated then saved,
in a next step index 32 is determined;
$f_u[32]*f_i[32]$ is calculated
$f_u[0]*f_i[0]$ is retrieved, and the sum $f_u[0]*f_i[0]+f_u[32]*f_i[32]$ is calculated then saved and so on until the 8 indexes are used. In this example, the index is determined as the current index+the number of threads (in this case 32).

As illustrated in FIG. 4, the different threads may access contiguous regions of GPU main memory 117, wherein the contiguous regions comprise the elements 407 being evaluated or calculated by the threads. For example, the elements 407 are calculated in parallel or at the same time by the respective threads. Certain GPUs are capable of coalescing together such accesses to improve memory bandwidth efficiency.

For example, in the first time-step thread 0 needs elements $f_i[0]$ and $f_u[0]$, thread 1 needs elements $f_i[1]$ and $f_u[1]$, ..., and thread 31 needs elements $f_i[31]$ and $f_u[31]$. $f_i[0], f_i[1], \ldots, f_i[31]$ and $f_u[0], f_u[1], \ldots, f_u[31]$ may be stored in contiguous memory regions. Since $f_i[0], f_i[1], \ldots, f_i[31]$ and $f_u[0], f_u[1], \ldots, f_u[31]$ are stored contiguously in memory, the read requests from these threads can be coalesced resulting in low latency and less bandwidth utilization. In the second time-step the elements 407, namely $f_i[32], f_i[33], \ldots, f_i[63]$ and $f_u[32], f_u[33], \ldots, f_u[63]$ may be stored in contiguous memory regions.

The partial inner products are then reduced in high-speed shared memory, and transformed to form (403) the scalar value alpha 406. For example, all 32 threads have computed the partial inner products pt (for t=0, 1, ..., 31) and stored them in shared memory 120. The first 16 threads (t=0, 1, ..., 15) may be selected and their partial sum may be retrieved from shared memory and add to it p(t+16) then the new result may be stored back into shared memory. Next the first 8 threads (t=0, 1, ..., 7) are chosen, their current partial sum is retrieved from shared memory and add p(t+8) to it. This continue until the value correspond to $p_0$ in shared memory contains the sum of all partial sums.

Each thread block writes (405) its update 409 to the gradient vector for the corresponding item directly into GPU main memory 117 using atomic memory operation. The order in which the gradients are formed is thus unknown, but once all thread blocks have finished execution, one is guaranteed that all partial sums have been applied. Using the atomic operation may be advantageous because if atomic operations are not used, then the partial sums may be written into a de-staging area of GPU main memory 117, and sum them all together in an additional stage. This has the problem that GPU memory usage scaling with {Total number of ratings in the training data}*N, which is highly undesirable.

The implementation may for example be written in CUDA C (NVIDIA). On an NVIDIA Quadro M4000 GPU, this implementation provides a fast computation method. The memory footprint of the present GPU-based implementation scales as:

$$O(\max(|(u;i):r_{ui}=1|;n_uN;n_iN))$$

where $n_u$ and $n_i$ denotes the total number of users and the total number of items respectively. This property allows for training on very large datasets despite the relatively limited memory capacity of modern GPU devices. For example, around 2.7 GB of GPU memory is required to train the Netflix dataset (e.g. matrix R) having 100 million ratings (assuming N=200) and thus the problem easily fits within the main memory of an inexpensive GPU (typically up to 12 GB). In contrast, a previous attempt to implement an alternating-least-square based matrix factorization approach on GPUs determined that the memory requirements for the same dataset exceeded 12 GB (for the equivalent of N=100).

FIG. 5 illustrates a simplified example of the present method. Suppose M items need to be determined that are dependent with each user, where item i may comprise a server and a user may comprise a client of a client-server configuration. After having fitted the model parameters $f_u$ and $f_i$ it may be determined that item i is dependent of user u if $r_{ui}$ is among the M largest values P $[r_{ui'}=1]$, where i' is over all items that user u did not depend on, i.e., over all i' with $r_{ui'}=0$. The probability P $[r_{ui}=1]$ is large if the user-item pair (u, i) is in one or more user-item co-clusters. Thus, along with a notification, it can be output the corresponding user-item co-clusters that cause P $[r_{ui}=1]$ or, equivalently, $(f_u,f_i)=\Sigma_c[f_u]_c[f_i]_c$ to be large. The user-item co-cluster c is determined as the subset of users and items for which $[f_u]_c$ and $[f_i]_c$, respectively, are large. The cells (0.54, 083 and 0.92) surrounded by doted lines corresponds to cells of matrix R having $r_{ui}=0$ referring to an unknown dependency, while the other cells of the clusters surrounded by solid lines correspond to cells of matrix R having $r_{ui}=1$. Consider checking dependency of a single item to user 6 (users 0-11 and items 0-11 correspond to the rows and columns of the matrix in 301). The probabilities of the fitted model for each user-item pair are depicted in FIG. 5. The probability estimate P $[r_{ui}]=1-e^{-<f_u,f_i>}$, u=6 is maximized among the unknown examples $r_{ui}=0$ for item i=4, and is given by 0.83. Therefore, item i=4 may be candidate item that may depend with user u=6. The corresponding factors are $f_i$=[1.39, 0.73, 0.82] and $f_u$=[0, 1.05, 1.25], which means that item i=4 is in all three co-clusters 303-307, while user u=6 is in co-cluster 505 and 507 only. The probability estimate $1-e^{-<f_u,f_i>}$, for u=6, i=4 is large because both user 6 and item 4 are in the co-clusters 505 and 507.

FIG. 5 further shows an example content 509 of the notification of the results of identifying user 6 and item 4. The content may for example be displayed on display 130. The content is so structured to enable a proper intervention in the system based on identified dependencies.

In the following, a method for fitting the model parameters $f_u$ and $f_i$ is described.

Given a matrix R, the parameters of the probability model may be fitted by finding the most likely factors $f_u$, $f_i$ to the matrix R by maximizing the likelihood (it is assumed that positive examples are generated independently across co-clusters 303-307 and across items and users in co-clusters):

$$\mathcal{L} = \Pi_{(u,i):r_{ui}=1}(1-e^{-<f_u,f_i>})\Pi_{(u,i):r_{ui}=0}e^{-<f_u,f_i>}$$

Maximizing the likelihood is equivalent to minimizing the negative log-likelihood:

$$-\log \mathcal{L} = -\Sigma_{(u,i):r_{ui}=1}\log(1-e^{-<f_u,f_i>})+\Sigma_{(u,i):r_{ui}=0}(f_u,f_i)$$

To prevent overfitting, an $l_2$ penalty may be added, which results in the following optimization problem:
minimize Q subject to $[f_u]_c$, $[f_i]_c \geq 0$, $\nabla$, where
$Q=-\log \mathcal{L} +\lambda\Sigma_i\|f_i\|_2^2+\lambda\Sigma_u\|f_u\|_2^2$, and $\lambda \geq 0$ is a regularization parameter.

In order to do the optimization, one might iterate between fixing the $f_u$, and minimizing with respect to the $f_i$, and fixing the $f_i$ and minimizing with respect to the $f_u$, until convergence.

This method may comprise a cyclic block coordinate descent or the non-linear Gauss-Seidel method. Whereas Q is non-convex in the $f_i$, $f_u$, Q is convex in the $f_i$ (with the $f_u$ fixed) and convex in the $f_u$ (with the $f_i$ fixed). Therefore, a solution to the subproblems of minimizing Q with fixed $f_i$ and minimizing Q with fixed $f_u$ can be found, e.g., via gradient descent or Newton's method. A convergence to a stationary point may be ensured. Specifically, provided that $\lambda > 0$, Q may be strongly convex in the $f_i$ (with the $f_u$ fixed) and in the $f_u$ (with the $f_i$ fixed). Thus, the subproblems have unique solutions and therefore, if each subproblem is solved exactly, convergence to a stationary point is ensured.

However, solving the subproblems exactly may slow down convergence, because when the $f_u$, $f_i$, are far from a stationary point, it indicates that there is little reason to allocate computational resources to solve the subproblems exactly. It may therefore be often more efficient to solve the subproblem only approximately in each iteration. Therefore, a projected gradient descent with backtracking line search may be used and only one single descent step, to solve the subproblems approximately, and iteratively update the $f_i$ and the $f_u$ via single gradient descent steps until convergence (see implementation details below). Convergence is declared if Q stops decreasing. This results in a very efficient algorithm that is essentially linear in the number of positive examples {(u, i): $r_{ui}=1$}, and the number of co-clusters N. Simulations have shown that performing only one gradient descent step will significantly speeds up the algorithms.

Implementation Details

In this section, the projected gradient descent approach that is used to solve the subproblems and the complexity of the overall optimization algorithm is described. It is sufficient to discuss minimization of Q with respect to the $f_i$, as minimization with respect to the $f_u$ is equivalent.

Noting that, because of $$Q=\Sigma_i(-\Sigma_{u:r_{ui}=1}\log(1-e^{-<f_u,f_i>})+\Sigma_{u:r_{ui}=1}<f_u,f_i>+\lambda\Sigma_u\|f_u\|^2+\lambda\Sigma_i\|f_i\|_2^2,$$

we can minimize Q for each $f_i$ individually. The part of Q depending on $f_i$ is given by $$Q(f_i)=-\Sigma_{u:r_{ui}=1}\log(1-e^{-<f_u,f_i>})+<f_i,\Sigma_{u:r_{ui}=0}f_u>+\lambda\|f_i\|_2^2$$

As mentioned above, the parameter $f_i$ may be updated by performing a projected gradient descent step. The projected gradient descent algorithm is initialized with a feasible initial factor f0 and updates the current solution $f_i^k$ to $f_i^{k+1}$ according to $$f_i^{k+1}=(f_i^k-\alpha_k\nabla Q(f_i^k)+,$$

where $(f)_+$ projects f on its positive part, $[(f)+]c=\max(0; [f]c)$, and the gradient is given by $$\nabla Q(f_i) = -\sum_{u:r_{ui}=1} f_u \frac{e^{-<f_u,f_i>}}{1-e^{-<f_u,f_i>}} + \sum_{u:r_{ui}=0} f_u + 2\lambda f_i, \qquad \text{Eqt Gr}$$

The step size ($\alpha_k$ is selected using a backtracking line search, also referred to as the Armijo rule, along the projection arc. Specifically, $\alpha_k=\beta^{t_k}$, where $t_k$ is the smallest positive integer such that $$Q(f_i^{k+1})-Q(f_i^k)\leq\alpha(\nabla Q(f_i^k),f_i^{k+1}-f_i^k),$$

where σ, β∈(0, 1) are constants. As the computation of both ∇Q($f_i$) and Q($f_i$) requires $\Sigma_{u:r_{ui}=0} f_u$, and typically the number of items for which $r_{ui}=1$ is small relative to the total number of items, we precompute $\Sigma_u f_u$ before updating all f, and then compute $\Sigma_{u:r_{ui}=0} f_u$ via $$\Sigma_{u:r_{u,i}=0} f_u = \Sigma_u f_u - \Sigma_{u:r_{ui}=1} f_u$$

Using the precomputed $\Sigma_{u:r_{ui}=0} f_u$, a gradient descent step of updating $f_i$ has cost O({u:$r_{ui}$=1}N). Thus, updating all $f_i$ and all $f_u$ has cost O({(i,u): $r_{ui}$=1}N), which means that updating all factors has cost linear in the problem size (i.e., number of positive examples) and linear in the number of co-clusters.

Figure 6:
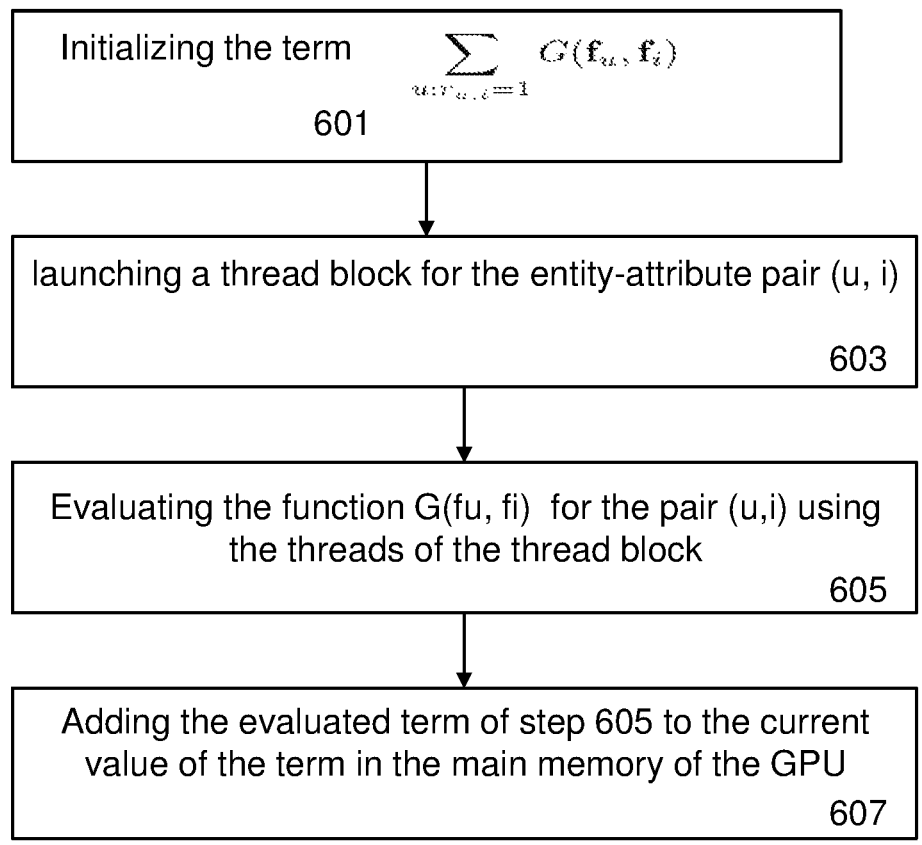
FIG. 6 is a flowchart of a method for evaluating the term $\Sigma_{u:r_{u,i}=1} G(f_u, f_i)$.

FIG. 6 is is a flowchart of a method for evaluating the term $\Sigma_{u:r_{u,i}=1} G(f_u,f_i)$ (or the term $\Pi_{u:r_{u,i}=1} G(f_u,f_i)$). The evaluation may be performed on a massively parallel processor such as a GPU system 101. For each user u of the sum of term $\Sigma_{u:r_{u,i}=1} G(f_u,f_i)$ (or of the multiplication of the term $\Pi_{u:r_{u,i}=1} G(f_u,f_i)$) a thread block of the GPU system 101 may be assigned.

In step 601, the term $\Pi_{u:r_{u,i}=1} G(f_u,f_i)$ may be initialized using a predefined value. The initialized term may be stored in the main memory 117. For example, the predefined value may be 0 or other values.

In step 603, a thread block may be launched or assigned for the entity-attribute pair (u, i).

In step 605, the function $G(f_u,f_i)$ may be evaluated for the pair (u.i) using the threads of the thread block.

In step 607, a selected thread of the thread block may add the evaluated function of step 605 to the current value of the term $\Sigma_{u:r_{u,i}=1} G(f_u,f_i)$ in the main memory 117 of the GPU system 101 using an atomic operation. This may result in a new value of the term $\Sigma_{u:r_{u,i}=1} G(f_u,f_i)$ in the main memory 117.

Steps 601-607 may be performed or repeated for each user u of the sum of the term. Each user u may be assigned a respective thread block. This may enable for example the parallel processing for all users using the thread blocks.

In another example, the method of FIG. 6 may similarly be applied for evaluating the term $\Pi_{u:r_{u,i}=1} G(f_u,f_i)$. In step 601, the term $\Sigma_{u:r_{u,i}=1} G(f_u,f_i)$ may be initialized using a predefined value. The initialized term may be stored in the main memory 117. In step 603, a thread block may be launched or assigned for the entity-attribute pair (u, i). In step 605, the function $G(f_u, f)$ may be evaluated for the pair (u.i) using the threads of the thread block. In step 607, a selected thread of the thread block may multiply the evaluated function of step 605 to the current value of the term $\Pi_{u:r_{u,i}=1} G(f_u,f_i)$ in the main memory 117 of the GPU system 101 using an atomic operation. This may result in a new value of the term $\Pi_{u:r_{u,i}=1} G(f_u,f_i)$ in the main memory 117.

Possible combinations of features described above can be the following:

1.) A computer implemented method comprising:
providing a data structure representing a matrix having rows representing entities and columns representing attributes of the entities;
assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix;
providing a multiprocessor unit comprising streaming multiprocessors, each being configured for executing at least one respective thread block, a thread block comprising a predefined number of threads;
determining a gradient vector of a likelihood function for finding optimal values of the affiliations vectors $f_u$ and $f_i$, wherein the gradient vector comprises for a given attribute i a first term being $\Sigma_{u:r_{u,i}=1} G(f_u,f_i)$ or $\Pi_{u:r_{u,i}=1} G(f_u,f_i)$, where the sum and multiplication are over entities that have a dependency with the attribute i;
initializing the first term using a predefined value and storing the initialized first term in a main memory of the multiprocessor unit;
for each entity of the sum or the multiplication of the first term of the given attribute:
launching a thread block for the entity-attribute pair (u, i);
evaluating the function $G(f_u,f_i)$ using the threads of the thread block;
selecting a thread of the thread block, wherein the selected thread is configured for adding or multiplying the evaluated first term of the entity to the current value of the first term in the main memory unit using an atomic operation.

2) The method of feature combination 1, wherein $G(f_u, f_i)=f_u(1-e^{-<f_u,f_i>})^{-1}$, wherein evaluating the function $G(f_u,f_i)$ comprises:
splitting the N elements of the inner product according to the predefined number of threads of the thread block of the entity;
processing by each thread of the threads of the thread block the respective assigned elements of the inner product, the result of the processing being stored in a shared memory of the multiprocessor unit;
summing the results stored in the shared memory;
evaluating the function for the entity by using the summed results and the affiliation vector $f_u$ of the entity.

3) The method of feature combinations 1 or 2, further comprising repeating steps d)-f) for each attribute of a cell of the matrix having a dependency value, thereby evaluating the probability model for multiple attributes.

4) The method of feature combination 3, wherein the evaluating of the first term for the multiple attributes is asynchronously performed or is performed in parallel.

5) The method of any of the previous feature combinations, wherein the evaluating of the first term is performed in parallel for the entities that have a dependency with the given attribute i.

6) The method feature combination 2, the splitting of the N elements further comprising: controlling the threads of the thread block to synchronously process a set of elements of the N elements, wherein the set of elements are stored in contiguous memory regions of the main memory.

7) The method of any of the previous feature combinations, the selected thread being a randomly selected thread.

8) The method of any of the previous feature combinations, further comprising: determining the initial number of clusters based on the number of threads per thread block.

9) The method of feature combination 2, further comprising: determining the initial number of clusters such that a same number of elements of the inner product is assigned to a respective thread of the thread block.

10) The method of feature combination 9, the same number of elements comprising one or more elements.

11) The method of feature combination 2, further comprising: determining a probability model using the affiliations vectors $f_u$ and $f_i$ as parameters, wherein the probability model presents the probabilities for an entity of the entities to depend on an attribute of the attributes, wherein the probability model is given by the following equation: $1-e^{-<f_u,f_i>}$, wherein parameters of the probability model are estimated by computing a minimum of the likelihood function defined by following equation Q subject to $[f_u]_c, [f_i]_c \geq 0, \forall_c$:

$$Q = -\log \mathcal{L} + \lambda \Sigma_i \|f_i\|_2^2 + \lambda \Sigma_u \|f_u\|_2^2, \text{ where}$$

$$\log \mathcal{L} = -\Sigma_{(u,i):r_{ui}=1} \log(1-e^{-<f_u,f_i>}) + \Sigma_{(u,i):r_{ui}=0} <f_u,f_i>$$

and $\lambda \geq 0$ is a regularization parameter, where c runs over each cluster of the N clusters, wherein the gradient vector is defined as follows $$\nabla Q(f_i) = -\Sigma_{u:r_{ui}=1} f_u (1-e^{-<f_u,f_i>})^{-1} + \Sigma_u f_u + 2\lambda f_i,$$

where $r_{ui}=1$ indicates a dependency between entity u and attribute i, and $r_{ui}=0$ indicates an unknown dependency between entity u and attribute i.
12) The method of feature combination 11, the predefined value comprising a value of the second term $\Sigma_u f_u + 2\lambda f_i$ of the gradient vector.
13) The method of feature combination 11, using the evaluated probability model to identify unknown cells of the matrix having unknown values $r_{ui}=0$ whose associated attributes and entities depend on each other, wherein each unknown cell is formed by the given attribute i and an entity of the entities and has a value indicative of unknown dependency.
14) The method of feature combination 1, wherein the data structure is a two-dimensional array of scalar elements, which captures dependencies between at least $10^4$ components.
15) The method of any of the previous feature combinations, wherein the data structure is representable as an adjacency matrix of a bipartite graph, preferably a bipartite graph of components versus component attributes.
16) The method of feature combination 11, the probability for an entity to depend on an attribute comprises the probability that at least one of:
the entity accesses data of the attribute;
the entity requests a service of the attribute.
17) The method of any of the previous feature combinations, wherein the multiprocessor unit comprises a graphical processing unit (GPU).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   a. providing a data structure representing a matrix having rows representing entities and columns representing attributes of the entities;
   b. assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix;
   c. providing a multiprocessor unit comprising streaming multiprocessors, each being configured for executing at least one respective thread block, a thread block comprising a predefined number of threads;
   d. determining a gradient vector of a likelihood function for finding optimal values of the affiliations vectors $f_u$ and $f_i$, wherein the gradient vector comprises for a given attribute i a first term comprising $\Sigma_{u:r_{u,i}=1} G(f_u,f_i)$ or $\Pi_{u:r_{u,i}=1} G(f_u,f_i)$, where the sum and multiplication are over entities that have a dependency with the attribute i;
   e. initializing the first term using a predefined value and storing the initialized first term in a main memory of the multiprocessor unit;
   f. for each entity of the sum or the multiplication of the first term of the given attribute:
      launching a thread block for the entity-attribute pair (u, i);
      evaluating the function $G(f_u,f_i)$ using the threads of the thread block;
      selecting a thread of the thread block, wherein the selected thread is configured for adding or multiplying the evaluated first term of the entity to the current value of the first term in the main memory unit using an atomic operation.

2. The method of claim 1, wherein the evaluating of the first term is performed in parallel for the entities that have a dependency with the given attribute i.

3. The method of claim 1, the selected thread being a randomly selected thread.

4. The method of claim 1, further comprising determining the initial number of clusters based on the number of threads per thread block.

5. The method of claim 1, wherein the data structure is a two-dimensional array of scalar elements, which captures dependencies between at least $10^4$ components.

6. The method of claim 5, wherein the data structure is representable as an adjacency matrix of a bipartite graph, preferably a bipartite graph of components versus component attributes.

7. The method of claim 1, wherein the multiprocessor unit comprises a graphical processing unit (GPU).

8. The method of claim 1, further comprising repeating steps d) through f) for each attribute of a cell of the matrix having a dependency value, thereby evaluating a probability model for multiple attributes.

9. The method of claim 8, wherein the evaluating of the first term for the multiple attributes is asynchronously performed or is performed in parallel.

10. The method of claim 1, wherein $G(f_u,f_i)=f_u(1-e^{-(f_u,f_i)})^{-1}$, wherein evaluating the function $G(f_u,f_i)$ comprises:
    splitting the N elements of the inner product according to the predefined number of threads of the thread block of the entity;
    processing by each thread of the threads of the thread block the respective assigned elements of the inner product, the result of the processing being stored in a shared memory of the multiprocessor unit;
    summing the results stored in the shared memory; and
    evaluating the function for the entity by using the summed results and the affiliation vector $f_u$ of the entity.

11. The method claim 10, the splitting of the N elements further comprising: controlling the threads of the thread block to synchronously process a set of elements of the N elements, wherein the set of elements are stored in contiguous memory regions of the main memory.

12. The method of claim 10, further comprising determining a probability model using the affiliations vectors $f_u$ and $f_i$ as parameters, wherein the probability model presents the probabilities for an entity of the entities to depend on an attribute of the attributes, wherein the probability model is given by the following equation: $1-e^{-\langle f_u,f_i\rangle}$, wherein parameters of the probability model are estimated by computing a minimum of the likelihood function defined by following equation Q subject to $[f_u]_c, [f_i]_c \geq 0, \forall_c$:

$$Q = -\log\mathcal{L} + \lambda\sum_i \|f_i\|_2^2 + \lambda\sum_u \|f_u\|_2^2,$$

$$\text{where } -\log\mathcal{L} = -\sum_{(u,i):r_{ui}=1} \log(1 - e^{-\langle f_u, f_i\rangle}) + \sum_{(u,i):r_{ui}=0} \langle f_u, f_i\rangle,$$

and $\lambda \geq 0$ is a regularization parameter, where c runs over each cluster of the N clusters, wherein the gradient vector is defined as follows:

$$\nabla Q(f_i) = -\Sigma_{u:r_{ui}=1} f_u (1-e^{-\langle f_u, f_i\rangle})^{-1} + \Sigma_u f_u + 2\lambda f_i,$$

where $r_{ui}=1$ indicates a dependency between entity u and attribute i, and $r_{ui}=0$ indicates an unknown dependency between entity u and attribute i.

13. The method of claim 12, the predefined value comprising a value of the second term $\Sigma_u f_u + 2\lambda f_i$ of the gradient vector.

14. The method of claim 10, further comprising determining the initial number of clusters such that a same number of elements of the inner product is assigned to a respective thread of the thread block.

15. The method of claim 14, same number of elements comprising one or more elements.

16. The method of claim 15, further comprising using the evaluated probability model to identify unknown cells of the matrix having unknown values $r_{ui}=0$ whose associated attributes and entities depend on each other, wherein each unknown cell is formed by the given attribute i and an entity of the entities and has a value indicative of unknown dependency.

17. The method of claim 15, wherein the probability for an entity to depend on an attribute comprises the probability that at least one of:
the entity accesses data of the attribute;
the entity requests a service of the attribute.

18. A computer program product comprising a computer-readable storage medium having computer-readable program code embodied therewith, the computer-readable program code configured to implement a method comprising:
a. providing a data structure representing a matrix having rows representing entities and columns representing attributes of the entities;
b. assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix;
c. providing a multiprocessor unit comprising streaming multiprocessors, each being configured for executing at least one respective thread block, a thread block comprising a predefined number of threads;
d. determining a gradient vector of a likelihood function for finding optimal values of the affiliations vectors $f_u$ and $f_i$, wherein the gradient vector comprises for a given attribute i a first term comprising $\Sigma_{u:r_{u,i}=1} G(f_u,f_i)$ or $\Pi_{u:r_{u,i}=1} G(f_u,f_i)$, where the sum and multiplication are over entities that have a dependency with the attribute i;
e. initializing the first term using a predefined value and storing the initialized first term in a main memory of the multiprocessor unit;
f. for each entity of the sum or the multiplication of the first term of the given attribute:
launching a thread block for the entity-attribute pair (u, i);
evaluating the function $G(f_u,f_i)$ using the threads of the thread block;
selecting a thread of the thread block, wherein the selected thread is configured for adding or multiplying the evaluated first term of the entity to the current value of the first term in the main memory unit using an atomic operation.

19. A computer system comprising a multiprocessor unit comprising streaming multiprocessors, each being configured for executing at least one respective thread block, a thread block comprising a predefined number of threads, the computer system further comprising a data structure representing a matrix having rows representing entities and columns representing attributes of the entities; the computer system being configured for:
assigning each entity u of the entities and attribute i of the attributes an affiliation vector $f_u$ and $f_i$ respectively, the affiliation vector being indicative of the strength of affiliation of the entity or the attribute to N predefined initial clusters of cells of the matrix;
determining a gradient vector of a likelihood function for finding optimal values of the affiliations vectors $f_u$ and $f_i$, wherein the gradient vector comprises for a given attribute i a first term being $\Sigma_{u:r_{u,i}=1} G(f_u,f_i)$ or $\Pi_{u:r_{u,i}=1} G(f_u,f_i)$, where the sum and multiplication are over entities that have a dependency with the attribute i;
initializing the first term using a predefined value and storing the initialized first term in a main memory of the multiprocessor unit;
for each entity of the sum or multiplication of the first term of the given attribute:
launching a thread block for the entity-attribute pair (u, i);
evaluating the function $G(f_u,f_i)$ using the threads of the thread block;
selecting a thread of the thread block, wherein the selected thread is configured for adding or multiplying the evaluated first term of the entity to the current value of the first term in the main memory unit using an atomic operation.

\* \* \* \* \*